May 20, 1969  R. G. ERVIN, JR  3,444,957
SHOCK ABSORBER FOR SAFETY BELT
Filed Dec. 13, 1967  Sheet 2 of 2
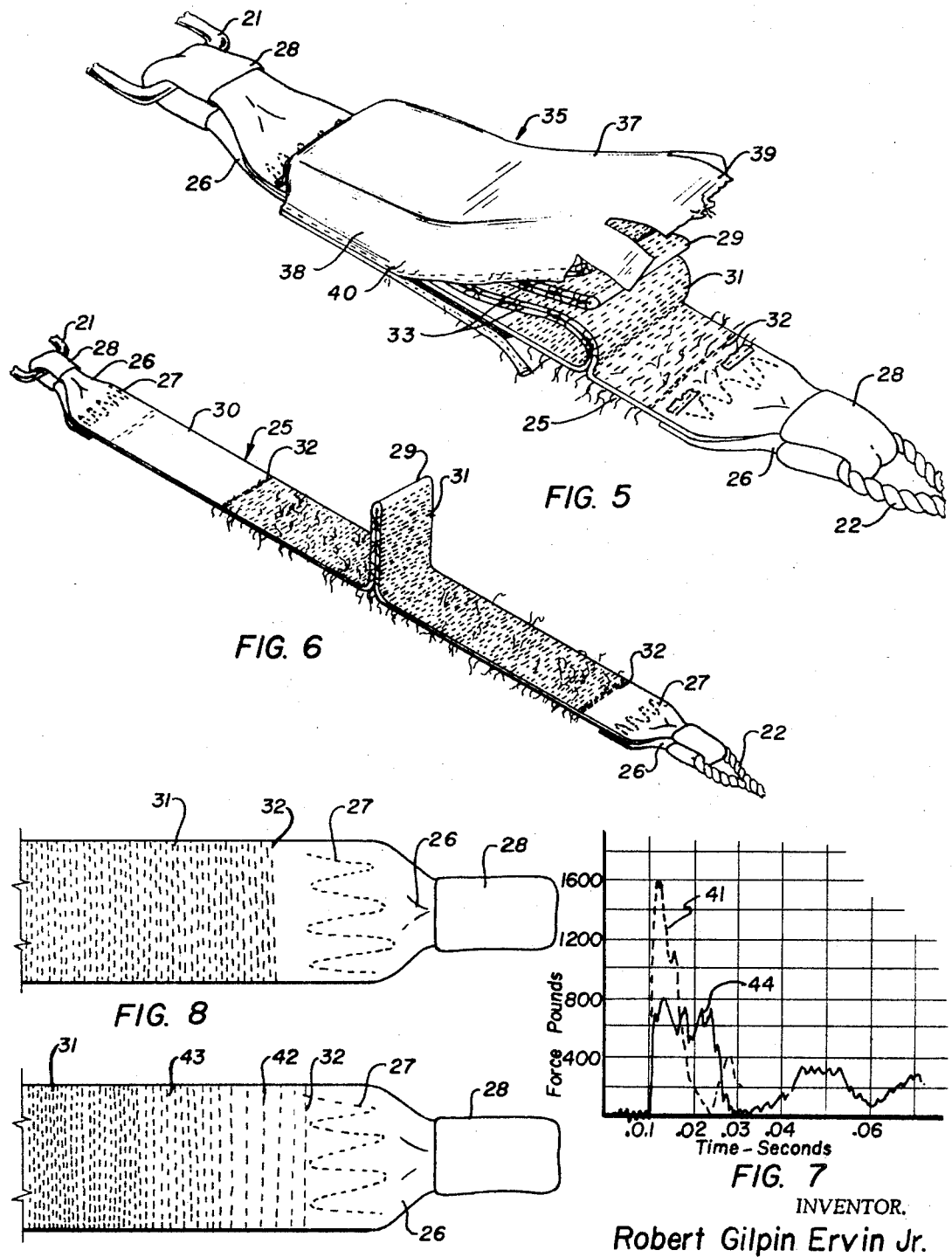
INVENTOR.
Robert Gilpin Ervin Jr.
BY
Van Valkenburgh & Lowe
ATTORNEYS

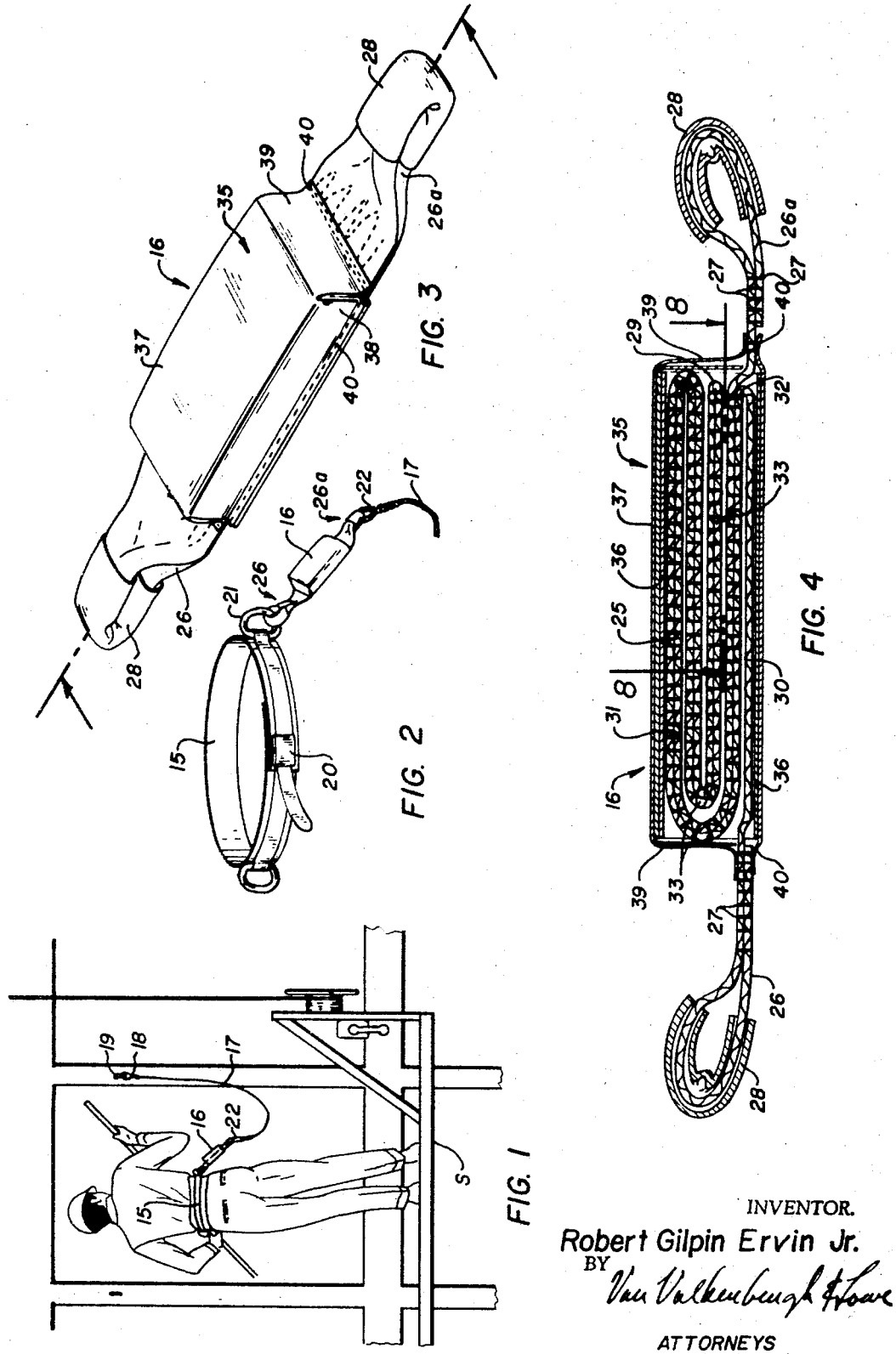

United States Patent Office 3,444,957
Patented May 20, 1969

3,444,957
SHOCK ABSORBER FOR SAFETY BELT
Robert Gilpin Ervin, Jr., Denver, Colo., assignor to Rose Manufacturing Company, Denver, Colo., a corporation of Colorado
Filed Dec. 13, 1967, Ser. No. 690,137
Int. Cl. E06c 7/18; A62b 1/16, 35/00
U.S. Cl. 182—3          5 Claims

ABSTRACT OF THE DISCLOSURE

A shock absorber for a safety belt assembly formed as a folded web connected in tandem with the safety belt lanyard. The folded web is transversely stitched with the stitching being adapted to be ripped apart in checking a fall of a workman wearing the safety belt assembly, the stitching thus producing a shock absorbing effect to decelerate the fall of the workman. As an improved feature, the stitching pattern is arranged to provide for a substantially uniform force of deceleration.

---

This invention relates to shock absorbers, and more particularly to shock absorbers for safety belts and improvements therein.

Whenever a workman is positioned on a scaffold, catwalk or other high place where a fall could result in a serious injury, the workman will wear a harness, such as a safety belt. The safety belt is attached to a short rope, a lanyard, which, in turn, is connected to an anchor ring or the like provided on the structure where the workman is located. To complete this safety belt assembly, a shock absorbing device is interconnected with the lanyard in such a manner as to prevent the lanyard from too suddenly checking the fall of the workman. The shock absorber is an essential part of the safety belt assembly for when a lanyard suddenly checks the fall of a workman, the shock force against his body is severe and can be the cause of serious internal injury.

The maximum force about a man's waist, as when a safety belt is checking a fall, should be much less than 1,000 pounds, and preferably not more than about 600 pounds. However, to suddenly check the fall of a man by a conventional lanyard directly attached to his safety belt, the shock force which will occur may exceed 3,000 pounds. If the lanyard is made of an elastic material, such as a lightweight nylon line, the shock force may be reduced, but the necessarily small diameter of the line and the resulting bounce are both undesirable. The shock absorber, whether in tandem with the lanyard or whether shunting a slack portion of the lanyard, should function whenever a pull upon it exceeds a selected value such as 600 pounds. It should extend itself or stretch, and continue to stretch until the fall is completely checked.

The present invention is concerned with improvements in a shock absorber which comprises a lapped web connected in tandem to the lanyard. The lap of the web is sewn together by a multitude of transverse rows of stitching, and the shock absorbing effect, to absorb kinetic energy, is imparted by merely pulling and breaking the stitching apart when a workman's fall is being checked. Furthermore, by knowing the strength of the stitching, the amount of stitching required in a shock absorber and the necessary length of lapped web can be easily determined for checking a given fall. Shock absorbers of this type have heretofore been used in parachute harnesses.

The present invention was conceived and developed when it was discovered, through dynamic tests, that a stitched web, designed to commence pulling apart under a pull of 600 pounds, would momentarily resist a much larger force or peak load. Accordingly, a paramount feature of the invention resides in modifying the stitching pattern at the inner end of the web lap where the pulling-apart of the stitches commence.

Another feature of the present invention resides in the use of a neatly formed protective cover for the lapped, stitched web of the shock absorber. The lapped web is folded into a compact package, and the cover is sewn about the package to protectively encase the web, and naturally, any disruption of the shock absorber, as when a fall is checked, will first break away the case to positively indicate that the shock absorber has been used and should be replaced.

Accordingly, the objects of the invention include the provision of a novel and improved lapped web shock absorber for a safety belt which will stretch by stitch ripping and without rebound whenever it is subjected to a dynamic pull, such as when checking the fall of a workman; will stretch to resist a specified pull, such as 600 pounds, to decelerate the fall of a workman, and will not require a momentary excess of force as the stitch-ripping commences; may be neatly and compactly folded and then snugly encased in a protective cover; and is a compact, neat-appearing, reliable, low-cost unit.

With the foregoing and other objects in view, my present invention comprises certain constructions, combinations and arrangements of parts and elements as hereinafter described, defined in the appended claims, and illustrated in preferred embodiment by the accompanying drawing in which:

FIGURE 1 is a small scale view of a workman upon a scaffold at the face of a building wearing a safety belt assembly which includes an improved shock absorber connected between the safety belt and the lanyard.

FIGURE 2 is a perspective view of the safety belt shock absorber and a portion of the lanyard according to the arrangement shown at FIG. 1.

FIGURE 3 is an isometric view of the shock absorber per se.

FIGURE 4 is a longitudinal, sectional view of the shock absorber taken substantially on the indicated line 4—4 at FIG. 3, but on an enlarged scale.

FIGURE 5 is a perspective view of a shock absorber similar to the showing at FIG. 3, but with the shock absorber illustrated as being connected to a ring and an eye splice, under tension, and with the stitching in the web commencing to pull apart.

FIGURE 6 is a perspective view on a reduced scale, illustrating the appearance of the shock absorber after it has been pulled apart to break substantially all of the stitching.

FIGURE 7 is a force-time diagram such as that obtained from oscillograph traces when shock absorbers are tested dynamically, the broken line curve illustrating the response by pulling apart a shock absorber web stitched together by a conventional stitching pattern, and the solid line curve illustrating the response by pulling apart a web stitched together with the improved stitching pattern.

FIGURE 8 is a plan view of a portion of a lapped web stitched together by a conventional stitching pattern.

FIGURE 9 is a plan view similar to FIG. 8, but illustrating the lapped web portion stitched together according to the improved stitching pattern.

Referring more particularly to the drawing, a safety belt assembly is used for a man working at a hazardous location as upon a scaffold at the face of a building as illustrated at FIG. 1. The assembly, in a preferred arrangement, will include a safety belt 15, a shock absorber 16 connected to the belt, and a lanyard 17 connected to the shock absorber. The outward end of the lanyard is provided with a snap hook 18 which may be secured to an anchor 19 on the face of a building near a workman's position.

The safety belt 15 is, basically, a band adapted to be strapped about a workman's waist as by a buckle 20. It will usually include various pockets and loops to carry tools, and will also include a ring 21 at one side or at the back of the belt for connection with one end of the shock absorber. The lanyard, at the opposite end of the shock absorber, is a length of nylon or wire rope, preferably about six feet long. Each end of the lanyard is spliced to form eyes 22, one eye being connected to the shock absorber while the other eye is connected to the snap hook 18.

The improved shock absorber is formed as a length of flat woven, nylon web 25 which may be approximately 2 inches wide and 4 feet long. Each end is overfolded to form a loop 26 which is permanently and securely held in position by stitching 27. One loop 26 is formed upon the safety belt ring 21, and the other loop 26a is formed upon a lanyard splice eye 22 to provide secure, permanent connections. In order to prevent and minimize wear of these loops upon the ring and splice eye, a short length of tubular webbing 28 is threaded upon each loop, as illustrated.

The reach of the web 25 between the loops 26 is folded at an outer-end turn point 29. The turn point 29 is a short distance from the center of this reach to provide a longer portion and a shorter portion with the excess of the longer portion forming an offset 30, hereinafter described. An array of transverse rows of stitching 31 is sewn in this lapped portion of the web, commencing at the outer turn point 29 and extending to an inner terminal stitch row 32 adjacent to the loop 26a on the shorter portion of the reach, as illustrated.

This overlapped, stitched web 25 is adapted to be folded and overfolded upon itself into a compact pile 33 as in the manner illustrated at FIG. 4. It is to be noted that the loop 26a will extend from one end of this folded pile 33 and that the offset 30 of the longer reach is of a length sufficient to permit it to underlay this folded pile 33 and to place the loop 26 beyond the end of the pile opposite the loop 26a.

So folded into a compact pile 33, the lapped web 25 may be snugly encased in a protective package 35. This package includes a rectangular tube 36 of cardboard-like material wherein the pile 33 and the reach 30 are slidably fitted. It is enclosed in an outer casing 37 of impregnated cloth which forms a tough, water-proof cover. The cloth-like casing 37, patterned and wrapped about the body of the pile, has side portions 38 and end flaps 39 to completely enclose the pile 33 and the tube 35 with the loop ends 26 and 26a projecting from opposite ends of the package. The casing 37 is secured in place by stitching 40 along one of its longitudinal edges and across its ends.

The shock absorber was first formed with uniformly spaced rows of transverse stitching 31 along the entire reach of the lapped portion and to the terminal stitch row 32, as in the manner illustrated at FIG. 8. By selection of a thread of a given strength, the gauge of the stitches in a given transverse row, and the spacing of the rows along the reach of the lapped web, a selected rupture strength of the threads may be established. This is in accordance with the practice of making similar shock absorbers for parachute harnesses. A stitch pattern, found to be suitable, consisted in using a heavy nylon thread which was sewn into the lapped web at a gage of seven stitches per inch, and in transverse rows 31 at a spacing of one-twentieth inch. This pattern provided a rupture strength of approximately 600 pounds as could be demonstated when the lap of the web, so sewn, was pulled to rip the stitches apart by a conventional slow-pull testing machine.

This stitch construction of the folded web 25 was subsequently tested under dynamic conditions where a load, approximating the weight of a man, was actually dropped various distances, with the shock absorber decelerating the fall by pulling the stitches apart. In this test, the pull against the shock absorber was measured by an oscillograph to provide an indication of the instantaneous loading. It was thereby discovered that the actual force required to initiate the stitch ripping to decelerate the fall was considerably more than 600 pounds, the loading would increase to as much as 1300 to 1800 pounds before stitches would commence to break. This is indicated by the broken line oscillograph trace 41 at FIG. 7. Not only did this loading greatly exceed the desirable maximum limit, but also the force required to rip the stitches to stop the fall was not sustained, but was reduced during the final portion of the ripping action. The cause for this undesirable action canont be precisely explained, but possibly a bunching-up action of several rows of the threads would occur before the ripping commenced, and this was followed by a sudden release of a number of rows of stitches. Regardless of the action, the oscillograph trace 41 clearly indicated that this uniform pattern of stitching the webs together to form a shock absorber was not desirable.

The present invention contemplates spacing the stitch pattern adjacent to the inner terminal row 32 to a degree sufficient to require, substantially, a pulling and breaking of the terminal row 32 before the adjacent rows can be pulled any significant amount. This spacing can be computed to provide a rough approximation of spacing where the stretch characteristics of the nylon thread are known, but it was found that actual testing of several straps was a more desirable method of establishing a spacing pattern adjacent to the terminal row 32.

These tests demonstrated that a significant improvement in the pull characteristics of the shock absorber web was obtained when the spacing of the stitch pattern adjacent to the inner terminal row 32 was between two to three times as great as the spacing of the transverse rows 31 across the remainder of the reach of the lapped web. Also, it was found that the spacing of the stitching could merge gradually from the wider spacing adjacent to the inner terminal stitch row 32 to the narrower, regular stitching pattern at a distance on the reach of the web which was approximately the width of the web.

In a preferred unit, as illustrated at FIG. 9, a group of stitching rows 42, adjacent to the inner terminal stitch row 32, were spaced one-eighth inch apart for a distance of approximately one inch, and another group of intermediate stitching rows 43, between the rows 42 and the regular transverse stitch rows 41, were spaced one-sixteenth inch apart.

The oscillograph trace 44 of this improved stitching pattern indicated that the breaking force, generated by ripping of the stitches, would be getween 600 and 800 pounds for an appreciable time interval and until the fall was fully checked. It is to be noted that this trace does not show the force as reaming constant, but that it fluctuates between the limits of 600 and 800 pounds. Such fluctuation is to be expected where stitches are being ripped apart, but it is not significant, and a breaking force indicated by trace 44 is basically satisfactory in all respects.

To obtain a greater or lesser breaking force, according to this desirable pattern, several expedients are possible. First, the weight and strength of the thread forming the transverse stitch rows 31 may be varied. The stitch gage of the sewing machine may be varied. Also, the spacing of the stitch rows may be varied, as desired, with the spacing at the inner terminal stitch row 32 being proportionally increased somewhat, as described. This permits the stitch ripping action to be effectively controlled and to meet various industrial specifications.

Whenever a fall occurs with a safety belt having the shock absorber, the force required to produce the stitch-ripping action will decelerate and stop the fall. In designing such a safety belt shock absorber, it is, therefore, desirable to correlate the contemplated fall with the amount of stitching so that there will always be at least a small portion of the stitching remaining unbroken as a simple safety factor. This is a simple matter of design when the length of the lanyard is known.

FIGURE 5 illustrates the manner in which the stitching will commence to rip when the shock absorber is in use. Actually, the package cover 35 will be first ripped apart, and the breaking of the stitching on this cover will add to the shock absorbing effect. More important, however, is the fact that the package cover 35 must necessarily be torn to some extent, even when checking a short fall, and this provides a positive indication that the shock absorber has now been used, served its purpose and must be replaced.

I have now described my invention in considerable detail. However, it is obvious that those skilled in the art can devise and fabricate alternate and equivalent structures which are within the scope and spirit of my invention. Hence, I desire that my protection be limited, not by the constructions illustrated and described, but only by the proper scope of the appended claims.

I claim:

1. A shock absorber for a safety belt and the like adapted to be interconnected in tandem with a lanyard to secure the safety belt to an anchor, and comprising:
    (a) a reach of a woven web of nylon or like material having a fastening means at each end thereof for the aforesaid interconnection,
    (b) a fold near the center of the reach to provide lapped web portions; and
    (c) closely spaced rows of transverse stitching on said lapped portions commencing at the fold and extending to an inner terminal stitch row adjacent to one of the aforesaid fastening means; wherein said rows of stitching are spaced apart at a substantially uniform spacing throughout the greater part of the stitched, lapped portion but with the rows of stitching adjacent to the aforesaid inner terminal stitch row being spaced apart at a relatively greater spacing whereby to minimize a shock effect occurring when the stitching commences to rip apart as the shock absorbers comes into use to check a fall of the user.

2. The shock absorber defined in claim 1, wherein the stitch row spacing adjacent to the inner terminal is at least twice the spacing of the regular stitch rows.

3. The shock absorber defined in claim 1, wherein the increased stitch row spacing adjacent to the inner terminal stitch row extends along the stitched lapped portion for a distance approximating the width of the web.

4. The shock absorber defined in claim 1, wherein the increased stitch row spacing adjacent to the inner terminal stitch row extends along the stitched lapped portion for a distance approximating the width of the web with the spacing being a maximum adjacent to the terminal stitch row and decreasing to a lesser spacing as the regular spacing over the greater portion of the lapped web is approached.

5. In the organization defined in claim 1, wherein the stitched web is piled by lap folds into a compact bundle and a package enclosing the bundle adapted to be ruptured when the shock absorber is pulled to initiate stitch ripping.

References Cited

UNITED STATES PATENTS

| | | | |
|---|---|---|---|
| 2,203,954 | 10/1942 | Roke | 182—3 |
| 2,613,865 | 10/1952 | Rose | 182—3 |

REINALDO P. MACHADO, *Primary Examiner.*